United States Patent [19]

Suda et al.

[11] Patent Number: 4,825,239
[45] Date of Patent: Apr. 25, 1989

[54] DISTANCE DETECTION METHOD AND APPARATUS

[75] Inventors: Yasuo Suda; Akira Akashi; Akira Ishizaki, all of Yokohama; Hiroshi Ohmura, Wako; Keiji Ohtaka, Tokyo, all of Japan

[73] Assignee: Canon Kabushiki Kaisha, Tokyo, Japan

[21] Appl. No.: 226,557

[22] Filed: Aug. 1, 1988

Related U.S. Application Data

[63] Continuation of Ser. No. 771,301, Aug. 30, 1985, abandoned.

[30] Foreign Application Priority Data

Sep. 11, 1984 [JP] Japan .................................. 59-191158

[51] Int. Cl.⁴ ................................................. G03B 3/00
[52] U.S. Cl. ..................................... 354/402; 354/407; 250/201; 356/4
[58] Field of Search ............... 354/400, 402, 406, 407, 354/408, 195.1; 250/201; 356/4

[56] References Cited

U.S. PATENT DOCUMENTS

| 4,492,448 | 1/1985 | Ishikawa et al. | 354/406 |
| 4,492,449 | 1/1985 | Oinoue et al. | 354/407 |
| 4,542,289 | 9/1985 | Yokoyama et al. | 354/402 |
| 4,560,863 | 12/1985 | Matsumura et al. | 354/407 |
| 4,561,750 | 12/1985 | Matsumura | 354/406 |
| 4,614,865 | 9/1986 | Hayashi | 354/407 |

Primary Examiner—Russell E. Adams
Attorney, Agent, or Firm—Fitzpatrick, Cella, Harper & Scinto

[57] ABSTRACT

A distance detection apparatus comprising: a distance detection unit for detecting information on a distance to an object, a controller for operating the detection means a plurality of times, and for processing a plurality of information on the distance and outputting an optimum distance information; a status detector for detecting a status of the object for outputting information on the status; and a circuit for altering an information processing method of the controller, in accordance with the output of the status detection means.

14 Claims, 5 Drawing Sheets

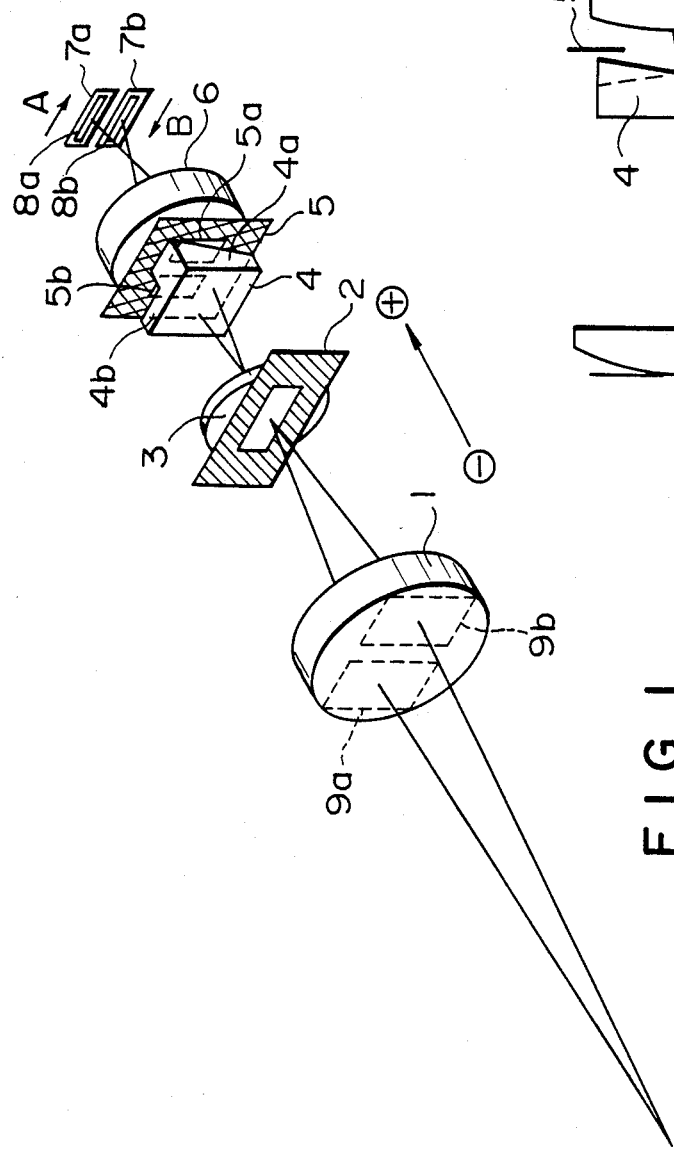
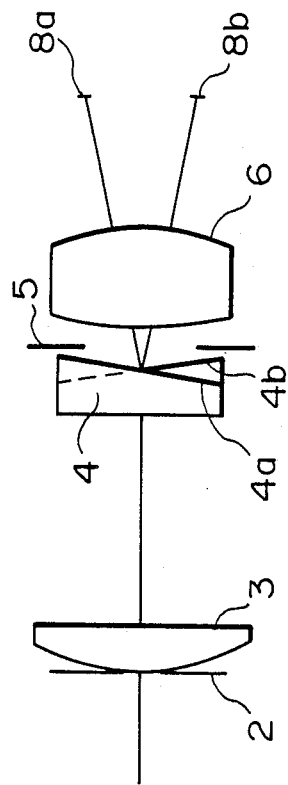
FIG. 1
FIG. 2

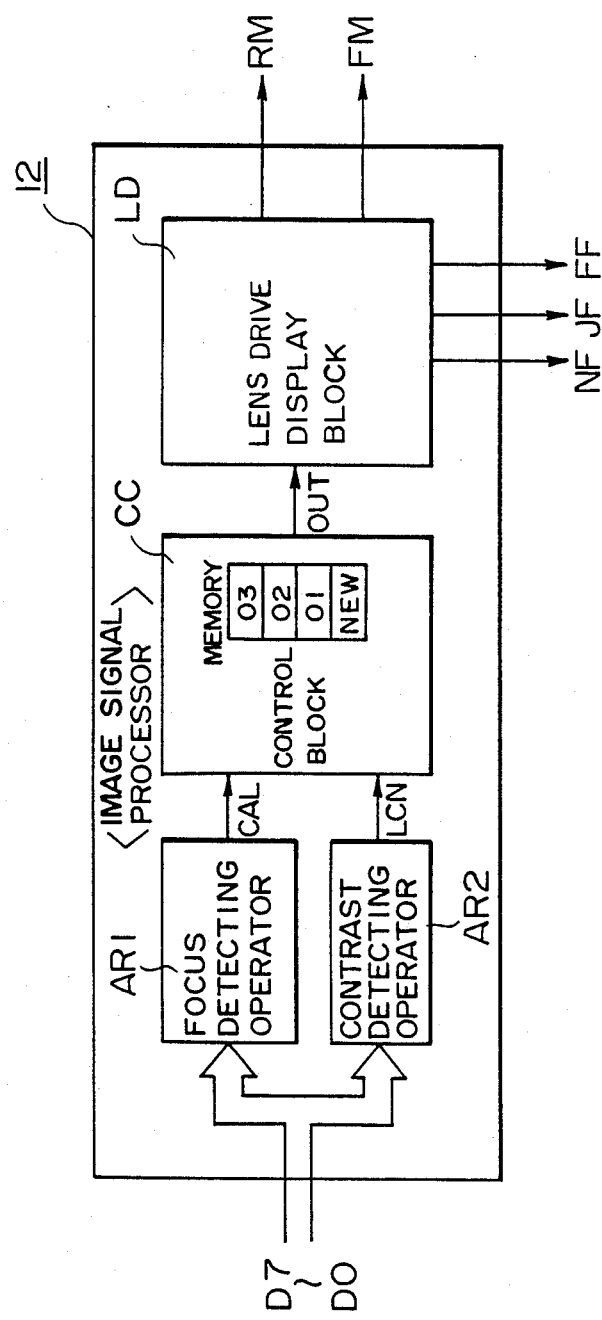
F I G. 5

DISTANCE DETECTION METHOD AND APPARATUS

This application is a continuation of application Ser. No. 771,301 filed Aug. 30, 1985, now abandoned.

BACKGROUND OF THE INVENTION

Field of the Invention

The present invention relates to a distance detection apparatus, and more particularly to distance detection method and apparatus suitable for a photographing device such as a still camera or a video camera.

Various distance detection apparatus which automatically detect a distance to an object for controlling a focus adjusting unit of an imaging lens have been proposed.

For example, in the apparatus disclosed in U.S. patent application Ser. No. 627,488 distance measurement information is time-serially and repeatedly detected and stored, and one of the distance measurement information is selected by a combination of newly detected distance measurement information and stored past distance measurement information. Since this method uses many instances of past distance measurement information, the more the past information is used, the higher is stability of the image in detecting an in-focus state but the longer is the time to obtain the final information which. As a result, the response is slow and the apparatus cannot follow a rapid change in the distance to an object.

SUMMARY OF THE INVENTION

It is an object of the present invention to provide an improved distance detection apparatus.

It is another object of the present invention to provide a distance detection apparatus comprising:

distance detection means for detecting information on a distance to an object;

control means for operating said detection means a plurality of times, processing a plurality of information on the distance and outputting an optimum distance information;

status detection means for detecting a status of the object and outputting information on the status; and means for altering an information processing method of said control means in accordance with the output of said status detection means.

It is another object of the present invention to provide a distance detection method comprising steps of:

detecting a distance to an object a plurality of times;

processing a plurality of distance information detected in the distance detection step and outputting an optimum distance information;

detecting a state of the object; and altering the processing of said optimum distance information outputting step in accordance with the state of the object.

It is another object of the present invention to provide a focus state detection method comprising steps of:

detecting information on a focus state a plurality of times;

storing the detected information;

comparing the latest detected information with a predetermined information;

adjusting the focus state in accordance with the latent detected information when focus state is worse than a predetermined state; and adjusting the focus state in accordance with a plurality of stored information.

It is another object of the present invention provide a focus state detection method comprising the steps of detecting information on a focus state a plurality of times;

storing the detected information;

detecting a contrast of an object;

storing a signal for maintaining focus adjustment as a latest signal when the detected contrast is low;

comparing the latest detected information with a predetermined information;

adjusting the focus state in accordance with the latest detected information when the focus state is worse then a predetermined state; and adjusting focus state in accordance with a plurality of stored information detected before the immediately previous detection when the focus state is better than the predetermined state.

BRIEF DESCRIPTION OF THE DRAWINGS

FIG. 1 shows a construction of a TTL automatic focus detection apparatus to which the distance detection apparatus of the present invention is applied, FIG. 2 shows an optical arrangement of the apparatus of FIG. 1, FIG. 5 is a circuit diagram of a signal processing unit of the apparatus shown in FIG. 4.

DESCRIPTION OF THE PREFERRED EMBODIMENTS

Figure 3A:
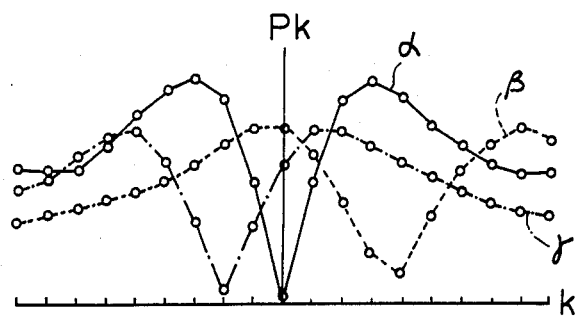
FIG. 3 illustrates detection of deviation of the apparatus of FIG. 1.
Figure 3B:
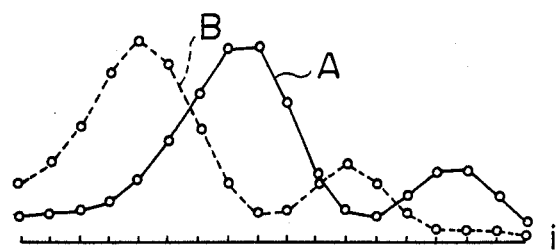
Figure 3C:
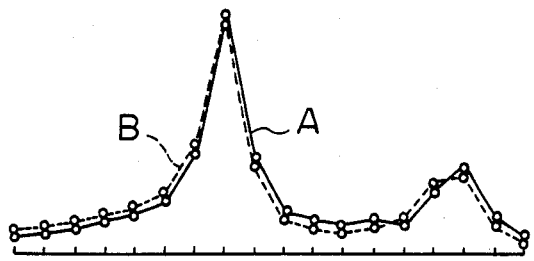
Figure 3D:

In the embodiment of the present invention described below, the distance detection apparatus of the present invention is applied to a TTL automatic focus detection apparatus of a camera and focusing operation of an imaging lens is carried out based on distance measurement information from the distance detection apparatus. When the distance detection apparatus measures the distance in the TTL system, the distance measurement information from the distance detection apparatus indicates a defocus distance of the imaging lens because a current position information of the imaging lens is included in the detected distance information, and it does not indicate a distance to the object. On the other hand, in a non-TTL system, the distance information is not directly obtained. In the present invention, the term distance information is defined to include the defocus amount and the distance information per se. An embodiment of the present invention which is applied to the TTL system automatic focus detection apparatus is now explained.

In FIG. 1, numeral 1 denotes an imaging lens, numeral 2 denotes a field mask, and numeral 3 denotes a field lens. The field mask 2 is located near an anticipated focusing plane of the imaging lens 1. A light beam is split by a half-mirror (not shown) arranged between the imaging lens 1 and the field mask 2, and a shutter, photosensing plane or image plane (not shown) is arranged at a position which is conjugate with the anticipated focusing plane. Numeral 4 denotes an image separation prism, numeral 5 denotes a stop for determining an F-value of a focus detection optical system and numeral 6 denotes a refocusing lens. A stop 5 has two apertures 5a and 5b. A light beam applied to the aperture 5a passes through a first inclined surface 4a of the image separation prism 4, and a light beam applied to the aperture 5b passes through a second inclined surface 4b (see FIG. 2). The light beam passed through the image separation prism 4 forms an image of the field mask 2 by the refocusing lens 6 on a photoelectric converter surface.

Since the light beam is deflected in two directions by the image separation prism 4, two upper and lower images 7a and 7b are separated. CCD line sensors 8a and 8b are arranged in the field mask images 7a and 7b to convert billiance of the object to electrical signals.

Since the field lens 3 projects the image of the stop 5 near an exit pupil of the imaging lens 1, a loss of the field mask images 7a and 7b by the imaging does not occur.

The light beam which forms the field mask image 7a passes through an area 9a on a pupil plane of the imaging lens 1, and the light beam which forms the field mask image 7b passes through an area 9b. Accordingly, when the focusing position by the imaging lens 1 is moved in a direction ⊕ beyond the anticipated focusing plane, the light intensity distribution in the field mask image 7a moves in a direction A, and the light intensity distribution in the field mask 7b moves in a direction B. When the focusing position of the imaging lens is moved in a direction ⊖, the directions of movement of the light intensity distributions in the field mask images are opposite to the above. From this principle, the defocus amount of the focusing plane of the imaging lens from the anticipated focusing plane can be determined by detecting a phase difference d between the photoelectrically converted outputs of the CCD line sensors 8a and 8b.

The phase difference d may be detected by a method disclosed in the U.S. patent application Ser. No. 464,578 assigned to the present assignee.

The phase difference d may be detected by the following algorithm. The two photoelectrically converted outputs A and B are defined by {a(1), a(2), ... a(n)} and {b(1), b(2), ... b(n)}, and a correlation Pk of the images A and B is defined by $$Pk = \sum_{i=1}^{n} |b(i + |k|) - a(i)| \quad (k < 0) \ldots (1)$$

$$= \sum_{i=1}^{n} |b(i) - a(i + k)| \quad (k \geq 0) \ldots (1)'$$

where $n = N - |k|, -N/2 \leq k \leq N/2$

From the formulas (1) and (1)', the correlation Pk calculates the coincidence of the images A and B with varying phase. The K which minimizes the correlation Pk corresponds to the phase difference d. Accordingly, by determining the phase difference d from the formulas (1) and (1)', the focus status of the imaging lens 1 and the defocus amount are determined.

FIG. 3 shows the signals of the images A and B, and the correlation Pk. FIG. 3C shows the image signals in the in-focus state, and the correlation Pk thereof is shown by α in FIG. 3A. Similarly, the correlation Pk for the defocus state of FIG. 3B is shown by β in FIG. 3A, and the correlation Pk for the defocus state of FIG. 3D is shown by Y in FIG. 3A. The phase difference is K=0, for α, K=4 for β and K=−2 for Y. In the in-focus state detection method by the phase diffrence detection, the defocus amount is detected by detecting the phase difference of the two images formed by the light beams from two different areas of the imaging lens 1.

Figure 4:
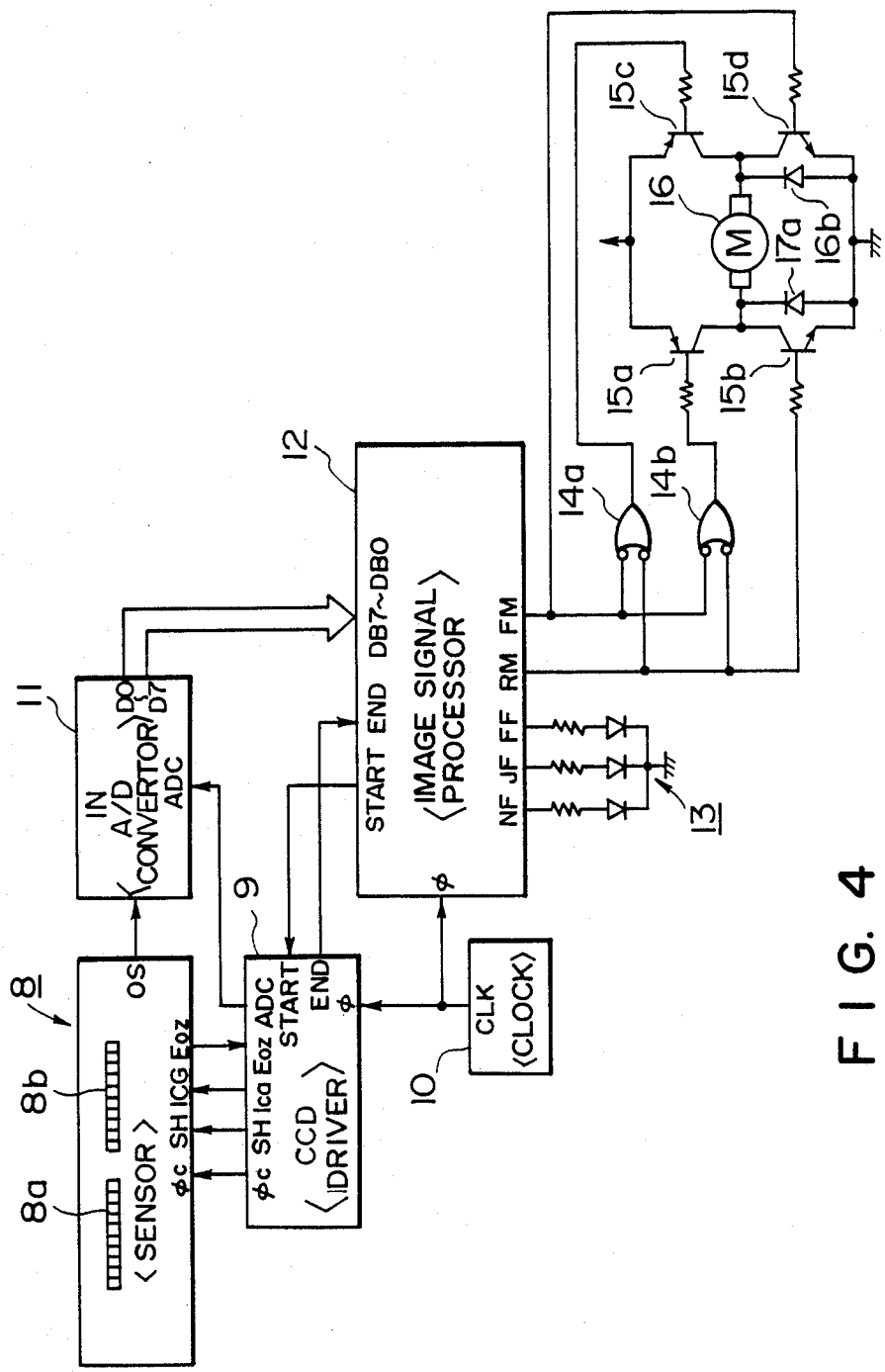
FIG. 4 shows an embodiment of the distance detection apparatus of the present invention applied to the apparatus of FIG. 1.

FIG. 4 shows a circuit diagram of the automatic focus detection apparatus used in the optical system of FIG. 1. Numeral 12 denotes an image signal processor which may be a one-chip microcomputer including a CPU (central processing unit), a memory, and input/output ports. A sensor 8 comprises sensor arrays 8a and 8b and a CCD (charge coupled device). Images are formed on the sensor arrays 8a and 8b by the light beams transmitted through the different pupil areas of the imaging lens. The charges of the optical images are stored and transferred by central signals φc, SH and ICG from a CCD driver 9. When the image signal processor 12 supplies a start signal START to the CCD driver 9, the CCD driver 9 sends the clock signal φc generated by a signal CLK of a clock generator 10 and the start of store signal ICG to the sensor 8. The sensor 8 thus starts to store the two images, and when a predetermined storage level is reached, it sends an end of store signal EOI to the CCD driver 9. The CCD driver 9 sends the photoelectric conversion output transfer signal SH to the sensor 8 to cause the stored charges to be transferred from the sensor to the CCD. It also sends an end signal END to the processor 12. In synchronism with the clock φc from the CCD driver 9, the sensor 8 time-serially supplies analog photo-electric converted signals OS of the two images to an AID converter 11. The AID converter 11 converts the signals OS to 8-bit digital signals in synchronism with a conversion signal ADC from the CCD driver 9, and the processor 12 receives the digital time-serial signals D0−D7 through terminals DB0−DB7. The processor 12 detects the deviation between the signals a(i) and b(i) (i=1−N) of the two input signals by a predetermined operation formula, which may be one described in the U.S. patent application Ser. No. 464,578.

Terminals RM and FM of the processor 12 are output terminals for driving a motor 16 coupled to the imaging lens. When both RM and FM are at high potential ("H"), transistors 15a and 15c are off through gates 14a and 14b, transistors 15b and 15d are on and the motor 16 is electrically braked through the transistors 15b and 15d and diodes 17a and 17b. When both RM and FM are at low potential ("L"), the transistors 15a−15d are off and the motor 16 is electrically opened. When RM is "H" and FM is "L", the transistors 15a and 15d are off, the transistors 15b and 15c are on and the motor 16 is energized from right to left. When RM is "L" and FM is "H", the transistors 15b and 15c are off and the transistors 15a and 15d are on, and the motor 16 is energized from left to right. When RM is "L" and FM is "H", the transistors 15b and 15c are off and the transistors 15a and 15d are on, and the motor 16 is energized from left to right, that is, in the opposite direction to that when RM is "H" and FM is "L". Terminals NF, JF and FF are drive terminals for LED's 13 for indicating the focusing state.

Details of the circuits of the automatic focus adjusting apparatus are not explained here because they are not directly connected to the present invention. The processor 12 having the function to calculate the deviation between the two images incorporates selection control means and control means for controlling selection and release. Since the processor 12 is constructed by the microcomputer, the selection control means and the selection/release control means are configured by a software by using the memory, arithmetic unit and CPU of the microcomputer.

FIG. 5 shows a main portion of the processor 12 constructed by the microcomputer of FIG. 3. AR1 denotes an arithmetic unit for calculating the deviation including the direction based on the data D0—D7, AR2 denotes an arithmetic unit for calculating a contrast, and CC denotes control means which controls in accordance with a flow chart of FIG. 5 by an instruction from the CPU. It comprises a memory NEW which stores a newest deviation (distance information), a memory O1 which stores the immediately previous distance information, a memory O2 which stores the next most previous distance information and a memory O3 which stores still the next most previous distance information. LD denotes a signal formation circuit for lens drive signals RM, FM, far-focus FF, in-focus JF and near-focus NF.

The arithmetic operation unit AR1 calculates the followings.

(1) Defocus amount

It calculates the phase difference d between the two images based on the formulas (1) and (1)' and converts the phase difference to the defocus amount of the imaging lens (see Japanese Unexamined Patent Publication No. 107311/1984)

(2) Detection of in-focus state

It detects in-focus state (JF), near-focus state 1 (NF), near-focus state 2 (NNF), far-focus state 1 (FF) or far-focus state 2 (FFF) in accordance with a present range. The near-focus states 1 and 2 and the far-focus states 1 and 2 are used to control the focus detection output. For example, if the defocus amount is less than 1 mm, it is the state 1, and if it is more than 1 mm, it is the state 2. Thus NF indicates a near-focus zone and NNF indicates a near-focus zone with a large defocus amount.

The arithmetic operation unit AR2 calculates the contrast of the object and evaluates the contrast of the object in order to determine if the defocus amount calculated in (1) is reliable. The evaluation of the contrast may be done in a manner described in the U.S. patent application Ser. No. 630,410 assigned to the present assignee. A contrast evaluation function may be a sum of squares of differences between adjacent bits of the image signal.

Figure 6:
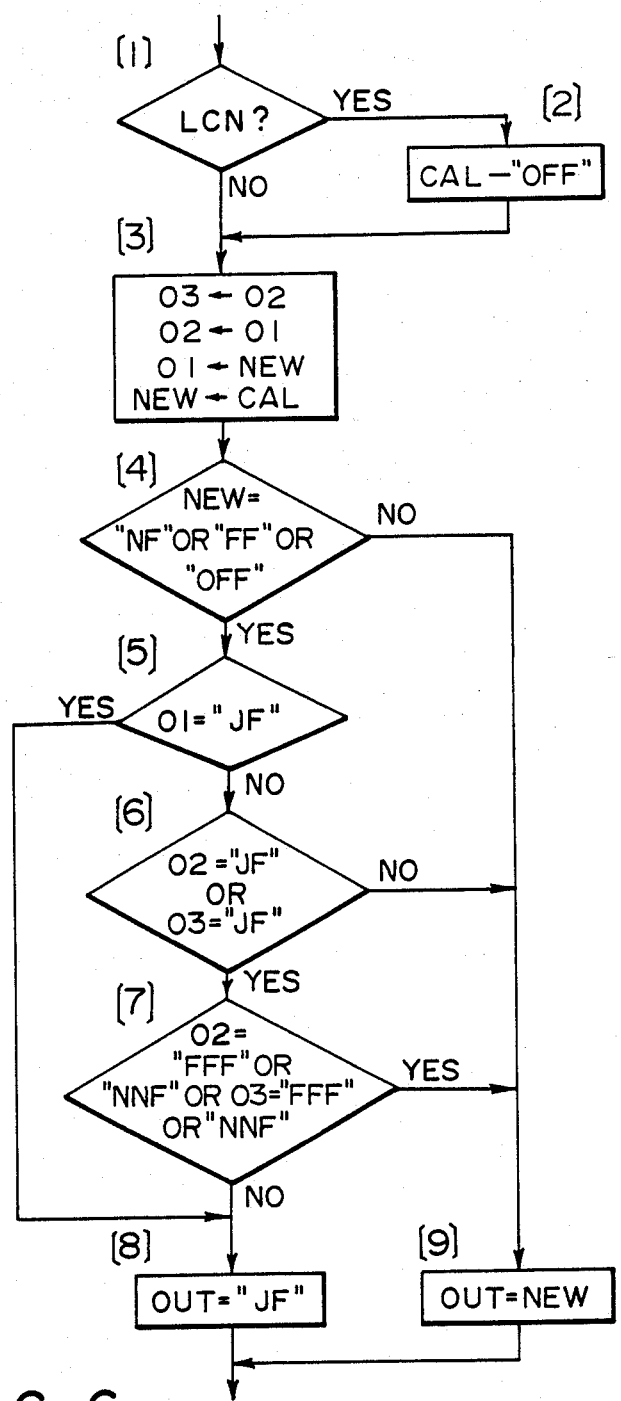
FIG. 6 is a flow chart of an operation of the circuit of FIG. 4.

FIG. 6 is a flow chart which illustrates the operation of the processors 12 constructed by the microcomputer of FIG. 5. Numerals in parentheses indicate the step numbers.

[1] Whether the output of the contrast detection arithmetic unit AR2 is higher than a predetermined reference or not (low contrast) is checked.

[2] If the contrast is lower than the reference, the output CAL of the focus detection arithmetic unit AR1 is turned off.

[3] Contents of the memory O1 stores the immediately previous focus state detected by the focus detection arithmetic unit AR1, the memory O2 which stores the next previous focus state, the memory O3 which stores the still further next previous focus state and the memory NEW which stores the current focus state are updated. The signal in the memory O2 is shifted to the memory O3, the signal in the memory O1 is shifted to the memory O2, and so on.

[4] Whether the current detected state is near-focus state or far-focus state, that is, whether it is near the in-focus state or not is checked. If the decision is NO. the step [5] and the following steps are not executed and the control unit CC supplies the detected result NEW to the circuit LD.

[5] If the decision in the step [4] is YES, the memory O1 is read out to check if it is the in-focus state JF.

[6] If the decision in the step [5] is NO, the memories O2 and O3 are read out to check if one of them is in-focus state JF. If the decision is NO, the step [7] and the following steps are not executed and the control unit CC produces the current detected signal.

[7] If the decision in the step [6] is YES, the memories O2 and O3 are again read out to check if one of them is FFF or NNF. If the decision is YES, the current detected signal NEW is outputted.

[8] If the decision in the step [7] is NO, that is, if none of them is FFF or NNF, the control unit outputs the in-focus state JF.

[9] If the decision in the step [5] is YES, the control unit CC outputs the in-focus state JF.

As shown in the flow chart, the control flow steps following the steps [4], [6] and [7] are not executed depending on the decisions made at the steps [4], [6] and [7], respectively, and the control unit CC outputs the distance information currently detected, and the signal formation circuit LD forms the control signals RM, FM, NF, JF and FF in accordance with the output of the control unit.

Accordingly, the signal JF is produced in accordance with the contents of the memories O1, O2 and O3 and the current information NEW, and this flow is not executed in the steps [4], [6] and [7] and the lens and the indications are controlled based on the current information NEW without regard to the contents of the memories O1, O2 and O3.

Although a detail of the signal formation circuit LD is not shown in FIG. 5, when the control unit CC produces the signal JF, the signals RM and FM are rendered "H" for a predetermined time period and then they are rendered "L" to brake the motor 16 into the stop state. When the control unit CC produces the current detected signal NF or NNF, the signal FM is "H" and the signal RM is "L". When the control unit CC produces the signal FF or FFF, the signal RM is "H" and the signal FM is "L". Thus, the motor is forwardly or backwardly rotated to drive the imaging lens into the in-focus position. The distance measurement is repeatedly carried out, and in each measurement, the control unit CC produces the distance information signal in accordance with the flow chart of FIG. 5. Thus, the motor 16 finally drives the lens into the in-focus position and the motor is braked. The LED 13 which indicates the focus state indicates the state of the imaging lens in each measurement. If the contrast of the object is low, the control unit produces the signal OFF so that the terminals RM and FM are rendered "L" and the motor 16 is not driven.

As seen from the flow chart of FIG. 6, the current measurement is judged based on the immediately previous, next previous and still further next previous measurements so that an optimum distance information is selected. Even if the content of NEW is not in-focus in the step [4], the signal JF is outputted if the content of O1, O2 or O3 is in-focus in the step [5] on [6] and content of any of O2 and O3 is not NNF or FFF. As a result, even if the in-focus state is momentarily broken by a vibration or other reason, the in-focus state indication does not disappear or the imaging lens is not driven. On the other hand, since the step [4] checks if the focusing state is a high defocus state or not and the contrast is low or not, if the object scene changes and the defocus amount is large, or if the contrast changes low, the flow of FIG. 6 is not executed and the current measurement result NEW is produced. Accordingly, the apparatus can rapidly follow the new scene. In the steps [6] and [7], if the current scene is a new scene, an affect by the past history is eliminated and the signal NEW is instantly produced.

In accordance with the present invention, the past information of the distance measurment is taken into consideration to select the final distance information, and the selection operation is skipped on the predetermined condition. Thus, even if the current distance measurement information greatly changes, the optimum distance information is rapidly obtained in each measurement. Thus, the present apparatus is very effective to various distance measurement apparatus.

In accordance with the preferred embodiment of the present invention, the control means skips the operation and outputs the latest distance measurement information (1) when the contrast of the object is low (when the contrast of the object is low or a sufficiently high contrast signal is not obtained because a brightness is low although the contrast of the object is high), or (2) The imaging lens is in a very defocus state.

In the above embodiment, the focusing operation is carried out based on one of the distance information previously measured or the latest distance information if the state of the object does not meet the predetermined condition. The present invention is not limited to the above embodiment. For example, the focusing operation may be carried out based on an arithmetic average of the past distance information, or if the state of the object does not meet the predetermined condition, another arithmetic operation such as selection of a minimum may be carried out and the focusing operation may be carried out based on the result of the arithmetic operation. For example, if the distance to the object vibrates in a predetermined range, it is desirable to carry out the focusing operation based on an average of the distance. In this case, an arithmetic average of a maximum distance and a minimum distance may be selected.

What we claim is:

1. A focus state detection method comprising steps of:
   detecting information on a focus state a plurality of times;
   storing the detected information;
   comparing the latest detected information with a predetermined information;
   adjusting the focus state in accordance with the latest detected information when focus state is worse than a predetermined state; and
   adjusting the focus state in accordance with a plurality of stored information detected before the immediately previous detection when the focus state is better than the predetermined state.

2. A focus state detection method according to claim 1, wherein said second adjusting step includes a step of comparing the immediately previously detected information with a second predetermined information and a step of comparing the next previously detected information with a third predetermined information.

3. A focus state detection method comprising steps of:
   detecting information on a focus state a plurality of times;
   storing the detected information;
   detecting a contrast of an object;
   storing a signal for maintaining focus adjustment as a latest signal when the detected contrast is low;
   comparing the latest detected information with a predetermined information;
   adjusting the focus state in accordance with the latest detected information when the focus state is worse than a predetermined state; and
   adjusting the focus state in accordance with a plurality of stored information detected before the immediately previous detection when the focus state is better than the predetermined state.

4. A focus state detection method according to claim 3 wherein said second adjusting step includes a step of comparing the immediately previously detected information with a second predetermined information and a step of comparing the next previously detected information with a third predetermined information.

5. An apparatus for causing an optical device to focus an object, comprising:
   detection means for detecting information on a focus detection condition of the optical device;
   information processing means for operating said detection means a plurality of times and for processing each said information detected by said detection means to form a plurality of focus informations used for causing the optical device to focus on the object; and
   selecting means for comparing said focus informations with a predetermined condition in a predetermined order to select one of said focus informations to provide a signal, as focus adjustment information, corresponding to the selected information.

6. An apparatus according to claim 5, further comprising:
   object state detection means for detecting a state of the object and, in accordance with the object state detected, for storing as focus information, information for overriding the selected focus adjustment information.

7. An apparatus according to claim 6, wherein said object state detection means detects contrast of the object.

8. An apparatus according to claim 5, wherein said predetermined condition of said selection means comprises an in-focus state, a state slightly deviated from the in-focus state, and a state largely deviated from the in-focus state, and wherein when the current information of said focus information indicates the state largely deviated from the in-focus state, the current information is selected.

9. An apparatus according to claim 5, wherein said information processing means includes a memory, and wherein said selecting means selects between one of two informations from previous detection operations stored in said memory and the information from the latest detection operation.

10. An apparatus for causing an optical device to focus an object, comprising:
    detection means for detecting information on a focus detection condition of the optical device;
    information processing means for operating said detection means a plurality of times and for processing each said information detected by said detection means to form a plurality of focus informations used for causing the optical device to focus on the object; and discrimination means for discriminating the focus information in one of an in-focus state, a state largely deviated from the in-focus state, and a state slightly deviated from the in-focus state, said discrimination means first discriminating the current focus information and thereafter discriminating the other focus information, and said discrimination means selecting the current focus information regardless of the content of the other focus information when the current focus information indicates the state largely deviated from the in-focus state.

11. An apparatus for detecting a focus adjusting state of an optical device, comprising:

light receiving means for generating a signal with respect to a light flux which is received by said light receiving means through said optical device;

information processing means for generating condition information concerning a focus adjusting state of said optical device, said information processing means generating a plurality of said condition information by time serially operating said light receiving means plural times; and comparing means for comparing a latest condition information with a predetermined condition, said comparing means outputting said latest condition information when said predetermined condition is satisfied, and for comparing preceding condition information with a condition representing the focus adjusting state when said predetermined condition is not satisfied.

12. An apparatus according to claim 11, wherein said predetermined condition is determined on the basis of the contrast of an object image.

13. An apparatus according to claim 11, wherein said condition representing the focus adjusting state is a condition of an in-focus state.

14. An apparatus for focus adjusting an optical device, comprising:

first means for outputting a condition signal representing a focusing condition state of said optical device upon receiving a light flux through said optical device;

second means for making said first means output a plurality of condition signal by time serially operating said first means plural times;

third means for memorizing the plurality of condition signals;

fourth means for producing adjusting information concerning an adjusting state of said optical device on the basis of said plurality of condition signals memorized by said third means; and fifth means for outputting information concerning a latest condition signal or said adjusting information.

* * * * *

UNITED STATES PATENT AND TRADEMARK OFFICE
CERTIFICATE OF CORRECTION

PATENT NO. : 4,825,239
DATED : April 25, 1989
INVENTOR(S) : Suda, et al.

It is certified that error appears in the above-identified patent and that said Letters Patent is hereby corrected as shown below:

[57] IN THE ABSTRACT:

Line 7, change "object for" to --object and for--.

FIGURE 4:

In Box 11, change "A/D CONVERTOR" to --A/D CONVERTER--.

COLUMN 1:

Line 27, change, "the past information" to --past information which--.

Line 28, change, "stability" to --the stability--.

Line 29, change "information" to --information.--.

Line 30, delete "which.".

COLUMN 2:

Line 7, change "of" to --of:--.

Line 17, change "then" to --than--.

UNITED STATES PATENT AND TRADEMARK OFFICE
CERTIFICATE OF CORRECTION

PATENT NO. : 4,825,239
DATED : April 25, 1989
INVENTOR(S) : Suda, et al.

It is certified that error appears in the above-identified patent and that said Letters Patent is hereby corrected as shown below:

COLUMN 3:

Line 68, change "Y" to --$\gamma$-- (Greek gamma).

COLUMN 4:

Line 1, change "Y." to --$\gamma$.--.

Line 31, change "photo-electric" to --photoelectric--.

Line 32, change "AID converter 11. The AID con-" to --A/D converter 11. The A/D con- --.

Line 44, change "high potential (H")," to --high potential ("H"),--.

Line 49, change "low potential (L")," to --low potential ("L"),--.

COLUMN 5:

Line 24, change "followings." to --following.--.

Line 30, change "No. 107311/1984)" to --No. 107311/1984).--

UNITED STATES PATENT AND TRADEMARK OFFICE
CERTIFICATE OF CORRECTION

PATENT NO. : 4,825,239

DATED : April 25, 1989

INVENTOR(S) : Suda, et al.

It is certified that error appears in the above-identified patent and that said Letters Patent is hereby corrected as shown below:

COLUMN 6:

Line 3, change "NO." to --NO,--.

Line 66, change "step [5] on [6]" to --step [5] or [6]--.

COLUMN 7:

Line 6, change "changes" to --change is--.

Line 10, change "affect" to --effect--.

Line 30, change "The" to --when the--.

COLUMN 8:

Line 19, change "3 wherein" to --3, wherein--.

UNITED STATES PATENT AND TRADEMARK OFFICE
CERTIFICATE OF CORRECTION

PATENT NO. : 4,825,239

DATED : April 25, 1989

INVENTOR(S) : Suda, et al.

It is certified that error appears in the above-identified patent and that said Letters Patent is hereby corrected as shown below:

COLUMN 9:

Line 25, change "time serially" to --time-serially--.

COLUMN 10:

Line 18, change "time serially" to --time-serially--.

Signed and Sealed this

Thirteenth Day of March, 1990

Attest:

JEFFREY M. SAMUELS

Attesting Officer

Acting Commissioner of Patents and Trademarks